(12) United States Patent
Ako et al.

(10) Patent No.: US 12,034,162 B2
(45) Date of Patent: Jul. 9, 2024

(54) METHOD FOR MANUFACTURING NONAQUEOUS ELECTROLYTE SECONDARY BATTERY AND NONAQUEOUS ELECTROLYTE SECONDARY BATTERY

(71) Applicant: SANYO Electric Co., Ltd., Daito (JP)

(72) Inventors: Atsutoshi Ako, Hyogo (JP); Yoshifumi Magari, Hyogo (JP); Kazuaki Tamura, Hyogo (JP); Akira Nishida, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 532 days.

(21) Appl. No.: 17/426,831

(22) PCT Filed: Nov. 27, 2019

(86) PCT No.: PCT/JP2019/046298
§ 371 (c)(1),
(2) Date: Jul. 29, 2021

(87) PCT Pub. No.: WO2020/162000
PCT Pub. Date: Aug. 13, 2020

(65) Prior Publication Data
US 2022/0123296 A1 Apr. 21, 2022

(30) Foreign Application Priority Data
Feb. 8, 2019 (JP) .................................. 2019-021805

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
CPC .... H01M 4/0525; H01M 4/505; H01M 4/525; H01M 10/0587; H01M 10/0409; H01M 10/0431
See application file for complete search history.

(56) References Cited

U.S. PATENT DOCUMENTS

2009/0169993 A1  7/2009  Ohashi et al.
2011/0206962 A1  8/2011  Minami et al.
(Continued)

FOREIGN PATENT DOCUMENTS

CN  101471451 A  7/2009
CN  102222788 A  10/2011
(Continued)

OTHER PUBLICATIONS

KR20060052625 English translation. Yamauchi et al. Korea. May 19, 2006. (Year: 2006).*
(Continued)

*Primary Examiner* — Christopher P Domone
(74) *Attorney, Agent, or Firm* — WHDA, LLP

(57) ABSTRACT

The nonaqueous electrolyte secondary battery according to one embodiment includes a flat wound electrode body in which a positive plate and a negative plate are wound via a separator and characterized in that the positive plate has a positive core and a positive mixed material layer that is formed on both sides of the positive core, the positive mixed material layer includes a lithium metal composite oxide represented by general formula Li1+xMaO2+b (in the formula, x, a, and b satisfy the conditions x+a=1, −0.2<x≤0.2, and −0.1≤b≤0.1, and M includes Ni and Co and at least one element selected from the group consisting of Mn and Al), and the positive plate has a flexibility index of 15 to 19. Such a positive plate is capable of having a high packing density while suppressing cracks in the positive mixed material layer and buckling of the positive plate and the negative plate.

4 Claims, 3 Drawing Sheets

(51) Int. Cl.
   *H01M 4/505*   (2010.01)
   *H01M 10/0525*  (2010.01)
   *H01M 10/0587*  (2010.01)

(52) U.S. Cl.
   CPC .. *H01M 10/0587* (2013.01); *H01M 2004/021* (2013.01); *H01M 2004/028* (2013.01)

(56) References Cited

U.S. PATENT DOCUMENTS

| | | | |
|---|---|---|---|
| 2011/0256437 | A1 | 10/2011 | Katsuki et al. |
| 2017/0092979 | A1* | 3/2017 | Chiga ................ H01M 10/056 |
| 2017/0117533 | A1 | 4/2017 | Takaichi et al. |

FOREIGN PATENT DOCUMENTS

| | | | |
|---|---|---|---|
| JP | 59-132566 | A | 7/1984 |
| JP | 4438863 | B2 | 3/2010 |
| JP | 2011-171250 | A | 9/2011 |
| JP | 2017-84769 | A | 5/2017 |
| JP | 2018-163781 | A | 10/2018 |
| JP | 2018-170240 | A | 11/2018 |
| KR | 20060052625 | * | 5/2006 |

OTHER PUBLICATIONS

The Extended European Search Report dated Feb. 18, 2022, issued in counterpart EP Application No. 19914592.1. (10 pages).
English translation of Search Report dated Dec. 4, 2023, issued in counterpart CN Application No. 201980091394.7. (3 pages).
International Search Report dated Mar. 3, 2020, issued in counterpart application No. PCT/JP2019/046298 (2 pages).

* cited by examiner

METHOD FOR MANUFACTURING NONAQUEOUS ELECTROLYTE SECONDARY BATTERY AND NONAQUEOUS ELECTROLYTE SECONDARY BATTERY

TECHNICAL FIELD

The present disclosure relates to a method for manufacturing a non-aqueous electrolyte secondary battery and a non-aqueous electrolyte secondary battery.

BACKGROUND ART

In recent years, there has been an increasing demand for higher capacity of a non-aqueous electrolyte secondary battery used in a vehicle such as an electric vehicle, and it has become necessary to introduce more active materials into a limited space in a battery to increase a packing density of an electrode plate. Particularly, in a non-aqueous electrolyte secondary battery comprising a wound electrode assembly in which a positive electrode plate and a negative electrode plate are wound with a separator interposed therebetween, it is a problem that cracking occurs in a positive electrode mixture layer when the positive electrode plate is made to have a high packing density. On the other hand, in the wound electrode assembly, it is known that a phenomenon of buckling in which the positive electrode plate or the negative electrode plate bends inside the battery occurs under certain conditions. Patent Literature 1 discloses a positive electrode mixture layer in which two layers having different compounding ratios of binders included in the respective layers are superimposed.

CITATION LIST

Patent Literature

PATENT LITERATURE 1: Japanese Unexamined Patent Application Publication No. 2017-84769

SUMMARY

Technical Problem

However, in the method disclosed in Patent Literature 1, it is not possible to prevent the occurrence of cracking of the positive electrode mixture layer made to have a high packing density, and the buckling of the positive electrode plate or the negative electrode plate is not considered, so there is still room for improvement.

Accordingly, it is an advantage of the present disclosure to provide a non-aqueous electrolyte secondary battery that prevents the cracking of a positive electrode mixture layer in a positive electrode plate made to have a high packing density and prevents the buckling of the positive electrode plate or a negative electrode plate.

Solution to Problem

A non-aqueous electrolyte secondary battery as one embodiment of the present disclosure is a non-aqueous electrolyte secondary battery comprises: a flat wound electrode assembly in which a positive electrode plate and a negative electrode plate are wound with a separator interposed therebetween. The positive electrode plate includes a positive core body and a positive electrode mixture layer formed on each side of the positive core body. The positive electrode mixture layer includes a lithium metal composite oxide represented by general formula $Li_{1+x}M_aO_{2+b}$ (where x, a, and b satisfy conditions that $x+a=1$, $-0.2<x\le0.2$, $-0.1\le b\le0.1$, and M includes Ni and Co and includes at least one element selected from the group consisting of Mn and Al). A softness index of the positive electrode plate is 15 to 19.

A method for manufacturing a non-aqueous electrolyte secondary battery as one aspect of the present disclosure is a method for manufacturing a non-aqueous electrolyte secondary battery, the method including: a winding body formation step of winding a positive electrode plate, a negative electrode plate, and a separator around an elliptical winding core to form a winding body; and an electrode assembly formation step of removing the winding core from the winding body and then pressing the winding body to form a flat wound electrode assembly. The positive electrode plate includes a positive core body and a positive electrode mixture layer formed on each side of the positive core body. The positive electrode mixture layer includes a lithium metal composite oxide represented by general formula $Li_{1+x}MaO_{2+b}$ (where x, a, and b satisfy conditions that $x+a=1$, $-0.2<x\le0.2$, $-0.1\le b\le0.1$, and M includes Ni and Co and includes at least one element selected from the group consisting of Mn and Al). A softness index of the positive electrode plate is 15 to 19.

Advantageous Effect of Invention

According to one aspect of the present disclosure, it is possible to provide a non-aqueous electrolyte secondary battery that prevents the cracking of a positive electrode mixture layer in a positive electrode plate made to have a high packing density and prevents the buckling of the positive electrode plate or a negative electrode plate.

DESCRIPTION OF EMBODIMENTS

An example of an embodiment will be described in detail below. In the present specification, the longitudinal direction in FIGS. 1 to 3 may be represented by "top and bottom," the lateral direction by "left and right," and the depth direction by "front and back."

Figure 1:
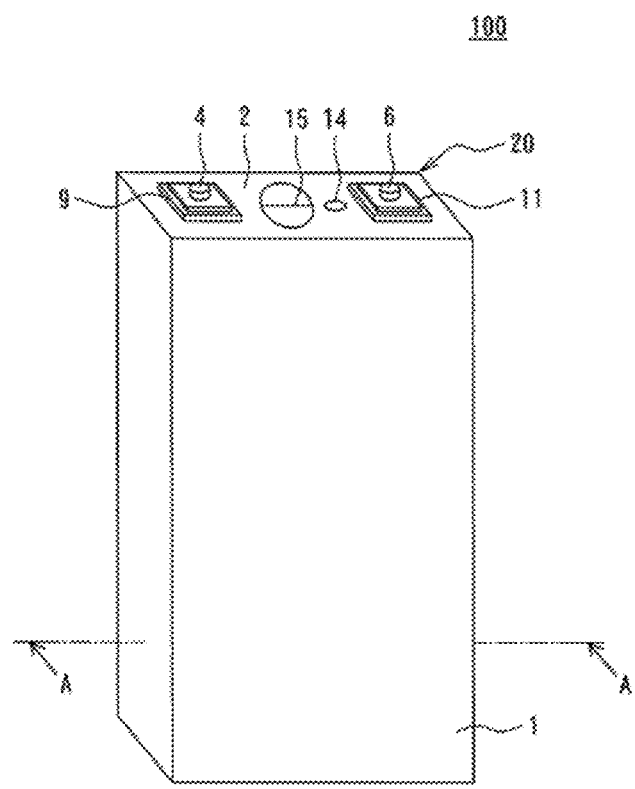
FIG. 1 is a perspective view of a rectangular non-aqueous electrolyte secondary battery that is an example of an embodiment.
Figure 2:
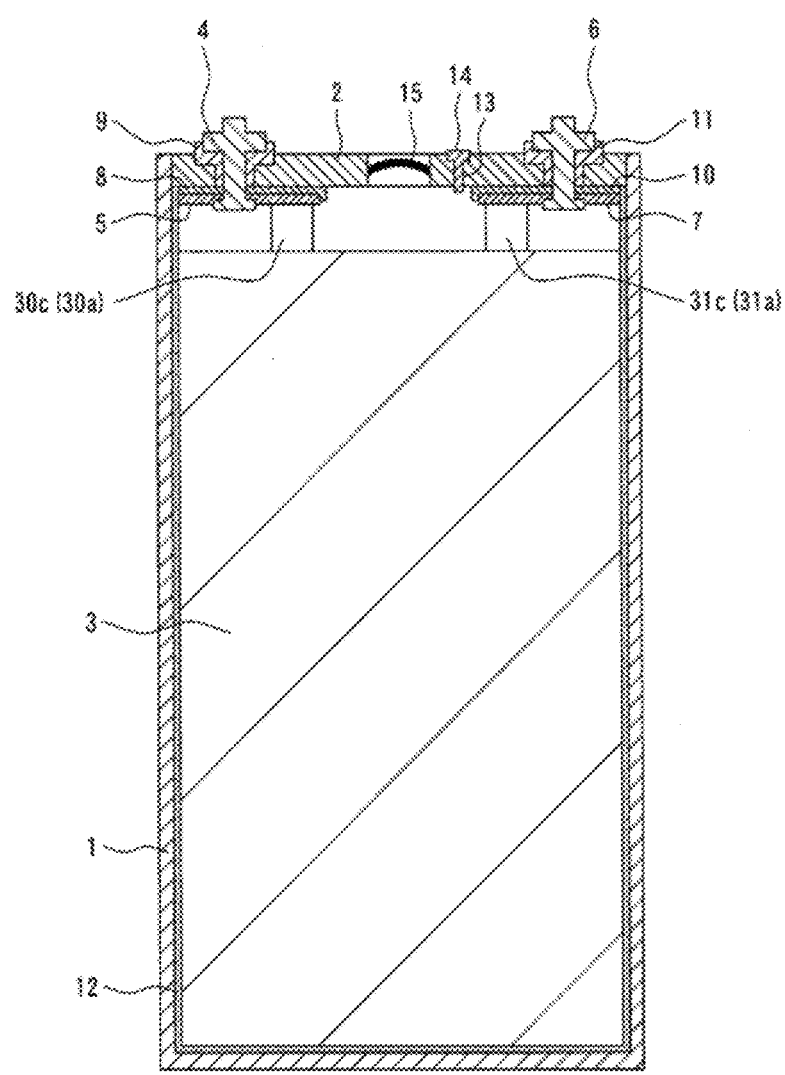
FIG. 2 is a sectional view taken along line A-A of FIG. 1.

With reference to FIGS. 1 and 2, a configuration of a non-aqueous electrolyte secondary battery 100 as an example of the embodiment will be described. FIG. 1 is a perspective view illustrating the appearance of the non-aqueous electrolyte secondary battery 100 as an example of the embodiment, and FIG. 2 is a vertical sectional view including line A-A in FIG. 1. As illustrated in FIGS. 1 to 2, the non-aqueous electrolyte secondary battery 100 comprises a battery case 20 that includes an outer package 1 having an opening, and a sealing plate 2 for sealing the opening. The outer package 1 and the sealing plate 2 are preferably made of metal and can be made of, for example, aluminum or an aluminum alloy. The outer package 1 is a rectangular bottomed cylindrical outer package having a bottom and a sidewall and having an opening at a position facing the bottom. Although the non-aqueous electrolyte secondary battery 100 illustrated in FIG. 1 is an example of the rectangular non-aqueous electrolyte secondary battery having the rectangular outer package 1 (rectangular battery case 20), the non-aqueous electrolyte secondary battery of the present embodiment is not limited thereto but may be a laminated outer package non-aqueous electrolyte secondary battery or the like having an outer package (a battery case made of a laminate sheet) using a laminate sheet formed by laminating metal foil with a resin sheet. The sealing plate 2 is connected to the opening edge of the rectangular outer package 1 by laser welding or the like.

The sealing plate 2 has an electrolyte injection hole 13. The electrolyte injection hole 13 is sealed by a sealing plug 14 after an electrolyte to be described later is injected. The sealing plate 2 has a gas discharge valve 15. The gas discharge valve 15 operates when the pressure inside the battery reaches or exceeds a predetermined value, and discharges the gas inside the battery to the outside of the battery.

A positive electrode terminal 4 is attached to the sealing plate 2 so as to project outside the battery case 20. Specifically, the positive electrode terminal 4 is inserted into a positive electrode terminal attachment hole formed in the sealing plate 2 and is attached to the sealing plate 2 in a state of being electrically insulated from the sealing plate 2 by an outer insulating member 9 disposed at the positive electrode terminal attachment hole outside the battery and an inner insulating member 8 disposed inside the battery. The positive electrode terminal 4 is electrically connected to a positive electrode current collector 5 in the battery case 20. The positive electrode current collector 5 is provided on the sealing plate 2 across the inner insulating member 8. The inner insulating member 8 and the outer insulating member 9 are preferably made of resin.

A negative electrode terminal 6 is attached to the sealing plate 2 so as to project outside the battery case 20. Specifically, the negative electrode terminal 6 is inserted into a negative electrode terminal attachment hole formed in the sealing plate 2 and is attached to the sealing plate 2 in a state of being electrically insulated from the sealing plate 2 by an outer insulating member 11 disposed at the negative electrode terminal attachment hole outside the battery and an inner insulating member 10 disposed inside the battery. The negative electrode terminal 6 is electrically connected to a negative electrode current collector 7 in the battery case 20. The negative electrode current collector 7 is provided on the sealing plate 2 across the inner insulating member 10. The inner insulating member 10 and the outer insulating member 11 are preferably made of resin.

The non-aqueous electrolyte secondary battery 100 comprises the wound electrode assembly 3 and the electrolyte solution, and the outer package 1 houses the wound electrode assembly 3 and the electrolyte solution. As will be described later with reference to FIG. 3, the wound electrode assembly 3 has a winding structure in which the positive electrode plate 30 and the negative electrode plate 31 are wound with a separator 32 interposed therebetween. At the top of the wound electrode assembly 3, a positive electrode tab 30c and a negative electrode tab 31c project from a positive electrode plate 30 and a negative electrode plate 31, respectively, and the positive electrode tab 30c and the negative electrode tab 31c are connected to the positive electrode current collector 5 and the negative electrode current collector 7, respectively, by welding or the like.

As illustrated in FIG. 2, the non-aqueous electrolyte secondary battery 100 may comprise an insulating sheet 12 disposed between the wound electrode assembly 3 and the outer package 1. The insulating sheet 12 has, for example, a bottomed box shape or a bag shape having an opening at the top, like the outer package 1. Since the insulating sheet 12 has a bottomed box shape or a bag shape having the opening at the top, the wound electrode assembly 3 can be inserted from the opening of the insulating sheet 12, and the wound electrode assembly 3 can be covered with the insulating sheet 12.

The material of the insulating sheet 12 is not particularly limited so long as being a material that has electrical insulating properties, chemical stability of not being affected by the electrolyte solution, and electrical stability of not electrolyzing with the voltage of the non-aqueous electrolyte secondary battery 100. As the material of the insulating sheet 12, for example, a resin material such as polyethylene, polypropylene or polyfluoroethylene can be used from the viewpoints of industrial versatility, manufacturing cost, and quality stability. Note that the insulating sheet 12 is not limited to a case shape such as the box shape or bag shape described above. For example, the insulating sheet 12 having a planar shape extending in the two directions of the lateral direction and the vertical direction may be wound around the wound electrode assembly 3 in the two directions of the lateral direction and the vertical direction. Thus, the wound electrode assembly 3 can be covered with the planar insulating sheet 12.

The electrolyte solution includes a solvent and an electrolyte salt dissolved in the solvent. A non-aqueous solvent can be used as the solvent. As the non-aqueous solvent, there may be used, for example, carbonates, esters, ethers, nitriles, amides, and a mixed solvent of two or more thereof. Examples of the carbonates include: cyclic carbonates such as ethylene carbonate (EC), propylene carbonate (PC), butylene carbonate, and vinylene carbonate; and chain carbonates such as dimethyl carbonate (DMC), ethyl methyl carbonate (EMC), diethyl carbonate (DEC), methyl propyl carbonate, ethyl propyl carbonate, and methyl isopropyl carbonate. The non-aqueous solvent may include a halogen substitute obtained by substituting at least a part of hydrogen of the above solvent with halogen atoms such as fluorine. Note that the electrolyte solution is not limited to a liquid electrolyte but may be a solid electrolyte for which a gel-like polymer or the like is used. The electrolyte salt includes a lithium salt. As the lithium salt, there can be used $LiPF_6$ or the like that is generally used as a supporting salt in the conventional non-aqueous electrolyte secondary battery 100. An additive such as vinylene carbonate (VC) can also be added as appropriate.

Figure 3:
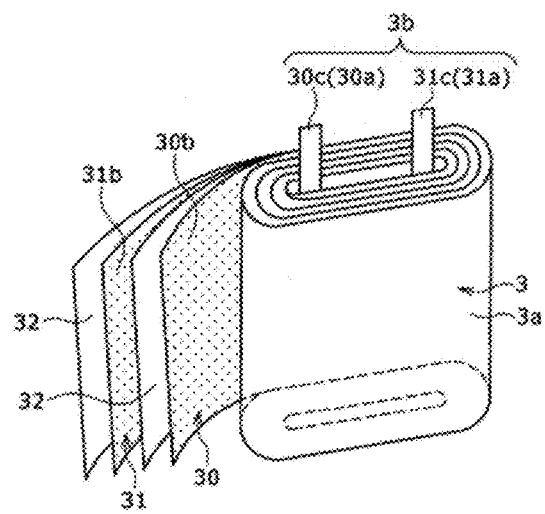
FIG. 3 is a perspective view of a wound electrode assembly of the non-aqueous electrolyte secondary battery illustrated in FIG. 2, with its winding outer end extended.

Next, the wound electrode assembly 3 will be described in detail with reference to FIG. 3. FIG. 3 is a perspective view of the wound electrode assembly 3, with its winding outer end extended. The wound electrode assembly 3 has a body portion 3a and a tab portion 3b.

The tab portion 3b is made up of a pair of a positive electrode tab 30c and a negative electrode tab 31c. Both the positive electrode tab 30c and the negative electrode tab 31c project upward from a gap in the winding center of the body portion 3a. Note that the positive electrode tab 30c and the negative electrode tab 31c may project from a position except for the winding center.

In the present embodiment, a positive core body 30a extends to constitute the positive electrode tab 30c, and a negative core body 31*a* extends to constitute the negative electrode tab 31*c*. Another conductive member can also be connected to the positive core body 30*a* or the negative core body 31*a* to form a positive electrode tab 30*c* or a negative electrode tab 31*c*. The base portion of the positive electrode tab 30*c* is preferably provided with an insulating layer or a protective layer having a higher electric resistance than that of the positive core body 30*a*.

Since the body portion 3*a* is formed by pressing after removal of a winding core as described later, the front-side surface and the back-side surface are substantially parallel, and the right and left ends are curved and flat. At the winding center of the body portion 3*a*, there is an elongated gap in the horizontal direction formed in a trace of the removal of the winding core, and the gap penetrates the body portion 3*a* in the vertical direction.

The body portion 3*a* has a winding structure in which the positive electrode plate 30 and the negative electrode plate 31 are wound with the separator 32 interposed therebetween. The positive electrode plate 30 has the positive core body 30*a* made of metal and a positive electrode mixture layer 30*b* formed on the positive core body 30*a* and including a positive electrode active material. As the positive core body 30*a*, there is used foil of metal, such as aluminum, stable in the potential range of the positive electrode plate 30, a film with the metal disposed on the surface layer, or the like. The thickness of the positive core body 30*a* is, for example, 10 to 20 μm. The negative electrode plate 31 has the negative core body 31*a* made of metal and a negative electrode mixture layer 31*b* formed on the negative core body 31*a* and including a negative electrode active material. As the negative core body 31*a*, it is possible to use foil of metal, such as copper, stable in the potential range of the negative electrode plate 31, a film with the metal disposed on the surface layer, or the like. The thickness of the negative core body 31*a* is, for example, 5 to 15 μm. In the non-aqueous electrolyte secondary battery 100, the size of the positive electrode plate 30 is preferably slightly smaller than the size of the negative electrode plate 31 in both the axial direction and the winding direction.

The softness index of the positive electrode plate 30 used for the wound electrode assembly 3 is 15 to 19. The softness index is an index indicating the softness of the positive electrode plate 30, and the larger the value of the softness index, the softer the positive electrode plate 30 is. The softness index of the conventional positive electrode plate 30 not having a high density of the positive electrode active material in the positive electrode mixture layer 30*b*, that is, not made to have a high packing density, is larger than 19, and for example, 22. When the softness index is large, the positive electrode plate 30 or the negative electrode plate 31 included in the wound electrode assembly 3 tends to buckle after the winding body is pressed. When the softness index is smaller than 13, the positive electrode plate 30 included in the wound electrode assembly 3 is excessively hard and tends to crack.

The softness index of the positive electrode plate 30 is measured by the following procedure (hereinafter, sometimes referred to as a "positive electrode winding test"):

(1) A positive electrode plate 30 having a width of 50 mm and a length of 100 mm is wound around a core rod having a diameter of 5 mm and held for 60 seconds.

(2) When the positive electrode plate 30 is released with the core rod facing in the vertical direction, the positive electrode plate 30 springs back and expands away from the core rod.

(3) A value obtained by subtracting the unit (mm) from the inner diameter of the positive electrode plate 30 after the spring-back is taken as the softness index of the positive electrode plate 30. The inner diameter of the positive electrode plate 30 means the length of the diameter passing through the position of the positive electrode plate 30 farthest from the center of the core rod and the center of the core rod in a period when the positive electrode plate 30 goes around the core rod from the winding inner end.

The positive electrode mixture layer 30*b* includes a positive electrode active material, a binder, and a conductive agent and is preferably provided on each side of the positive core body 30*a*. The positive electrode plate 30 can be produced by applying a positive electrode active material slurry including the positive electrode active material, the binder, the conductive agent, and the like on the positive core body 30*a*, drying the coated film, and then compressing the coated film with a roller or the like to form the positive electrode mixture layer 30*b* on each side of the positive core body 30*a*.

As the positive electrode active material, there is included a lithium metal composite oxide represented by general formula $Li_{1+x}M_aO_{2+b}$ (where x, a, and b satisfy conditions that $x+a=1$, $-0.2<x\leq0.2$, $-0.1\leq b\leq0.1$, and M includes Ni and Co and includes at least one element selected from the group consisting of Mn and Al). A small amount of another lithium metal composite oxide or the like may be included as the positive electrode active material, but the lithium metal composite oxide represented by the above general formula is preferably used as the main component.

The lithium metal composite oxide may include other elements except for Ni, Co, Mn, and Al. Examples of other elements include alkali metal elements except for Li, transition metal elements except for Ni, Co, and Mn, alkaline earth metal elements, Group 12 elements, Group 13 elements except for Al, and Group 14 elements. Specifically, Zr, B, Mg, Ti, Fe, Cu, Zn, Sn, Na, K, Ba, Sr, Ca, W, Mo, Nb, Si, and the like can be exemplified. Note that inorganic compound particles such as zirconium oxide, tungsten oxide, aluminum oxide, and lanthanoid-containing compounds may be fixed to the particle surface of the lithium metal composite oxide.

The particle size of the lithium metal composite oxide is not particularly limited but, for example, the average particle size is preferably 2 μm or more and less than 30 μm. When the average particle size is less than 2 μm, there is a case where the resistance increases by inhibiting the conduction of electricity by the conductive agent in the positive electrode mixture layer 30*b*. On the other hand, when the average particle size is 30 μm or more, the load characteristic may be lowered due to a decrease in the reaction area. The average particle size means a volume average particle size measured by a laser diffraction method and a median diameter at which a volume integrated value is 50% in a particle size distribution. The average particle size can be measured, for example, by using a laser diffraction scattering particle size distribution measuring device (manufactured by HORIBA, Ltd.).

Examples of the binder included in the positive electrode mixture layer 30*b* include fluorine resins such as polytetrafluoroethylene (PTFE) and polyvinylidene fluoride (PVdF), polyacrylonitrile (PAN), polyimide resins, acrylic resins, and polyolefin resins. By adjusting the hardness of the positive electrode plate 30 with the binder, the softness index of the wound electrode assembly 3 can be adjusted.

Examples of the conductive agent included in the positive electrode mixture layer 30b include carbon materials such as carbon black (CB), acetylene black (AB), Ketjen black, and graphite. These materials may be used alone or as a mixture of a plurality of materials.

The positive electrode mixture layer 30b has a packing density of 3.2 g/cm$^3$ to 3.8 g/cm$^3$. With the packing density in this range, it is possible to provide the non-aqueous electrolyte secondary battery 100 that comprises the positive electrode plate 30 made to have a high packing density, while preventing the cracking of the positive electrode mixture layer 30b and the buckling of the positive electrode plate 30 or the negative electrode plate 31.

The negative electrode mixture layer 31b includes a negative electrode active material and a binder and is preferably provided on each side of the negative core body 31a. The negative electrode plate 31 can be produced by applying a negative electrode active material slurry including the negative electrode active material, the binder, and the like on the negative core body 31a, drying the coating film, and then compressing the coated film with a roller or the like to form the negative electrode mixture layer 31b on each side of the negative core body 31a.

Examples of the negative electrode active material include low-crystalline carbon-coated graphite obtained by forming a low-crystalline carbon coating on the surface of graphite. The low-crystalline carbon is an amorphous or microcrystalline carbon material in a turbulent layer structure with a graphite crystal structure not developed or is a carbon material having a very fine particle size instead of a spherical shape or a scale shape. For example, a carbon material having a d(002) plane spacing larger than 0.340 nm by X-ray diffraction is the low-crystalline carbon. In addition, a carbon material, which is observed with a scanning electron microscope (SEM) or the like and has a measured average particle size of primary particles of 1 μm or less, is also the low-crystalline carbon. Specific examples of the low-crystalline carbon include hard carbon (hardly graphitized carbon), soft carbon (easily graphitized carbon), carbon black such as acetylene black, Ketjen black, thermal black, furnace black, carbon fiber, activated carbon, and the like. The negative electrode active material is not particularly limited so long as being able to reversibly adsorb and release lithium ions, and there can be used, for example, a carbon material such as natural graphite or artificial graphite, a metal alloyed with Li such as silicon (Si) or tin (Sn), or an oxide including a metal element such as Si or Sn. The negative electrode mixture layer 31b may include a lithium-titanium composite oxide.

As the binder included in the negative electrode mixture layer 31b, a known binder can be used, and as in the case of the positive electrode, fluorine resins such as PTFE or (PVdF), PAN, polyimide resins, acrylic resins, polyolefin resins, and the like can be used. Examples of the binder used in the case of preparing the negative electrode mixture slurry by using an aqueous solvent may include CMC or a salt thereof, styrene-butadiene rubber (SBR), polyacrylic acid (PAA) or a salt thereof, and polyvinyl alcohol (PVA).

A porous sheet having ion permeability and insulating properties is used for the separator 32. Specific examples of the porous sheet include a microporous film, a woven fabric, and a nonwoven fabric or the like. The material of the separator 32 is preferably olefin resins such as polyethylene and polypropylene, cellulose, and the like. The separator 32 may be a laminate having a cellulose fiber layer and a thermoplastic resin fiber layer such as an olefin resin. The separator may be a multilayer separator including a polyethylene layer and a polypropylene layer, and there can also be used a separator applied with a resin such as an aramid resin or inorganic fine particles such as alumina or titania on the surface of the separator 32.

Figure 4:
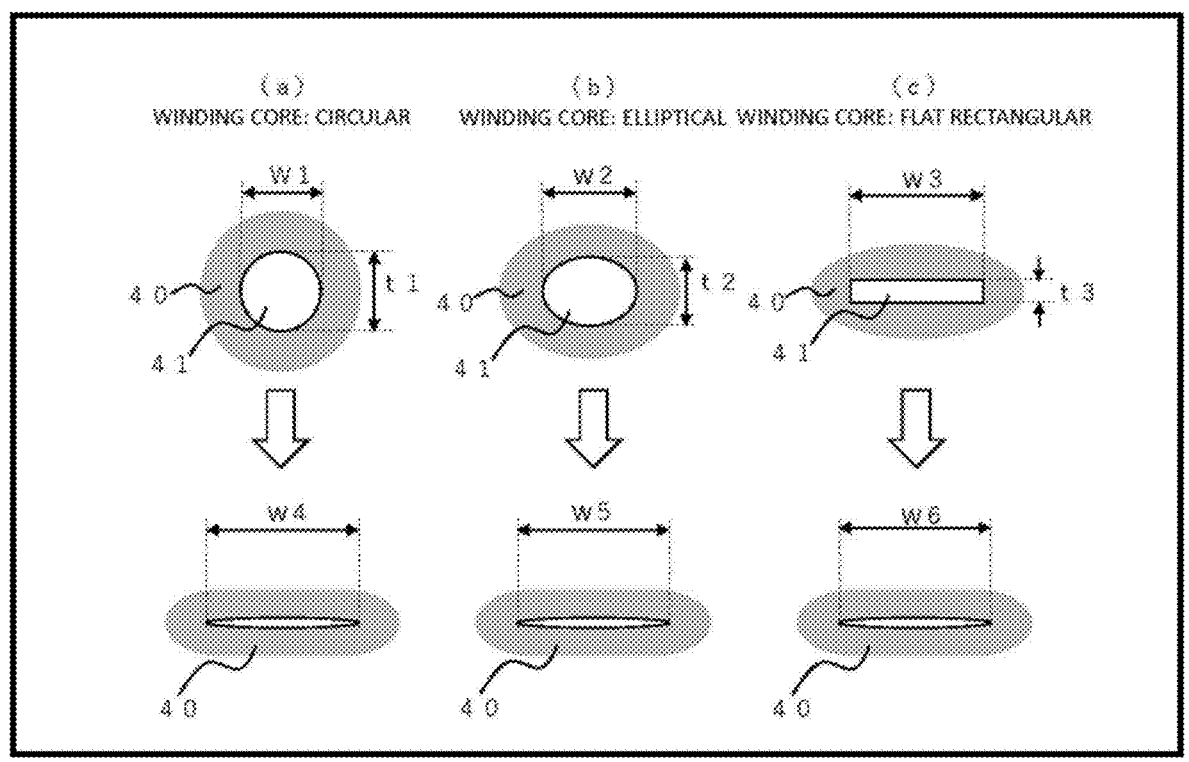
FIG. 4 is a plan view illustrating a change in shape from a winding body before pressing to the wound electrode assembly after pressing.

Next, a method for manufacturing the wound electrode assembly 3 will be described in detail with reference to FIG. 4. FIG. 4 illustrates a change in shape from a winding body 40 before pressing to the wound electrode assembly 3 after pressing (the positive electrode tab 30c or the negative electrode tab 31c is not illustrated). The three upper drawings are plan views of the winding body 40 before pressing and illustrate cases where the shapes of winding core 41 are a circular, elliptical, and flat rectangular, respectively, from left to right. The circular, elliptical, and flat rectangular shapes are distinguished by the ratio of the major axis (w1, w2, w3) and the minor axis (t1, t2, t3) passing through the center of each shape and intersecting at right angles to each other. Here, the circular shape includes a true circular shape and a substantially circular shape and refers to a case where a ratio (hereinafter referred to as a flatness ratio) t1/w1 of the length of the minor axis to the length of the major axis is 95% or more and 100% or less. The elliptical shape is a shape flatter than the circular shape, and the flatness ratio t2/w2 is 71% or more and less than 95%. The flat rectangular shape is a shape flatter than the ellipse, and the flatness ratio t3/w3 is less than 71%. Note that the flat rectangular shape may have rounded corners.

In a winding body formation step, the positive electrode plate 30, the negative electrode plate 31, and the separator 32 are wound around the elliptical winding core 41 illustrated in FIG. 4(b) to form the winding body 40. Forming the elliptical shape can prevent buckling because the change in shape at the time of pressing is smaller than in the case of the circular shape. When the flatness ratio is as small as in the case of the flat rectangular shape, cracking tends to occur because the positive electrode plate 30 is curved at the right and left ends of the winding core 41, and the elliptical shape is more preferable than the flat rectangular shape.

The winding body 40 formed in the winding body formation step is pressed after the removal of the winding core 41 to form a flat electrode assembly in an electrode assembly formation step. In FIG. 4, the three lower drawings are plan views of the wound electrode assembly 3 after pressing. Even when the winding core 41 has any of the circular, elliptical, and flat rectangular shapes, the shape can be substantially the same after pressing.

The ratio of the longest inner peripheral diameter of the winding body 40 to the longest inner peripheral diameter of the wound electrode assembly 3 (longest inner peripheral diameter of winding body 40/longest inner peripheral diameter of wound electrode assembly 3) can be set to 71% to 94%. The longest inner peripheral diameter is the longest dimension in a period when the wound electrode assembly 3 or the winding body 40 goes around the winding center from the winding inner end. In the respective cases where the shapes of the winding core 41 are circular, elliptical, and flat rectangular, the ratio of the longest inner peripheral diameter of the winding body 40 to the longest inner peripheral diameter of the wound electrode assembly 3 is w1/w4, w2/w5, or w3/w6, respectively.

The present embodiment will be further described below with reference to examples, but the present disclosure is not limited to these examples.

Example 1

After mixing of $Li_{1.054}Ni_{0.199}Co_{0.597}Mn_{0.199}Zr_{0.005}O_2$ as a positive electrode active material, 5% by mass of carbon black relative to the positive electrode active material, and 2% by mass of polyvinylidene fluoride (PVdF) relative to the positive electrode active material are mixed, N-methyl-2 pyrrolidone (NMP) was added, and the mixture was stirred using a mixer (T.K. HIVIS MIX, manufactured by PRIMIX Corporation) to prepare a positive electrode mixture slurry. Aluminum foil having a thickness of 15 µm was coated with the slurry as a positive core body and then dried and compressed by a roller. In this way, there was produced a positive electrode plate having a thickness of 140 µm in which a positive electrode mixture layer was formed on each side of the positive core body.

After mixing of low-crystalline carbon-coated graphite as a negative electrode active material, 1% by mass of styrene-butadiene rubber (SBR) relative to the negative electrode active material, and 0.5% by mass of carboxymethyl cellulose relative to the negative electrode active material, water was added, and the mixture was stirred using a mixer (T.K. HIVIS MIX, manufactured by PRIMIX Corporation) to prepare a negative electrode mixture slurry. Copper foil having a thickness of 10 µm was coated with the slurry as a negative core body and then dried and compressed by a roller. In this way, there was produced a negative electrode plate having a thickness of 160 µm, in which a negative electrode mixture layer was formed on each side of the negative core body.

[Positive Electrode Winding Test]

The positive electrode plate was cut into dimensions of 50 mm in width and 100 mm in length, wound around a core rod having a diameter of 5 mm, held for 60 seconds, and then released. The diameter of the positive electrode plate having sprung back was measured as a softness index. The softness index of the positive electrode plate was 19.

[Evaluation of Wound Electrode Assembly]

The positive electrode plate having a length of 500 mm and a width of 75 mm and the negative electrode plate having a length of 500 mm and a width of 78 mm were superimposed via a separator made of a microporous polypropylene film having a thickness of 16 µm, fixed at one end, and wound around an elliptical winding core having a flatness ratio of 85%. Next, the winding end was fixed with a tape, the winding core was removed, and press-formation is performed to produce a wound electrode assembly. From the appearances of the positive electrode plate and negative electrode plate obtained by dissembling the wound electrode assembly after pressing, it was confirmed that no cracking or buckling had occurred in the positive electrode plate and the negative electrode plate.

Example 2 to 3

In Example 2 and Example 3, the positive electrode winding test and the evaluation of the wound electrode assembly were performed in the same manner as in Example 1, except that the hardness of the positive electrode mixture layer was adjusted by changing the amount of the binder included in the positive electrode mixture slurry to 3% by mass for the positive electrode active material and 4% by mass for the positive electrode active material, respectively. The softness indices of the positive electrode winding tests of Example 2 and Example 3 were 17 and 15, respectively.

Comparative Example 1

In Comparative Example 1, the wound electrode assembly was evaluated in the same manner as in Example 1, except that the hardness of the positive electrode mixture layer was adjusted by changing the amount of binder included in the positive electrode mixture slurry to 5% by mass relative to the positive electrode active material. The softness index by the positive electrode winding test of Comparative Example 1 was 13.

Comparative Example 2 to 5

In Comparative Examples 2 to 5, the positive electrode winding test and the evaluation of the wound electrode assembly were performed in the same manner as in Examples 1 to 3 and Comparative Example 1, except that the shape of the winding core was changed to a circular shape having a flatness ratio of 95%.

Comparative Examples 6 to 9

In Comparative Examples 6 to 9, the positive electrode winding test and the evaluation of the wound electrode assembly were performed in the same manner as in Example 1 to 3 and Comparative Example 1, except that the shape of the winding core was changed to a flat rectangular shape having a flatness ratio of 64%.

TABLE 1

| | Softness index of positive electrode plate | Flatness ratio of winding core | Longest inner peripheral diameter of winding body/longest inner peripheral diameter of wound electrode assembly | Occurrence of cracking of positive electrode mixture layer | Occurrence of buckling of positive electrode plate or negative electrode plate | Overall Evaluation |
|---|---|---|---|---|---|---|
| Example 1 | 19 | 80%(Elliptical) | 80% | No | No | Usable |
| Example 2 | 17 | 80%(Elliptical) | 80% | No | No | Usable |
| Example 3 | 15 | 80%(Elliptical) | 80% | No | No | Usable |
| Comparative Example 1 | 13 | 80%(Elliptical) | 80% | Yes | No | Unusable (battery resistance is affected from initial stage) |
| Comparative Example 2 | 19 | 95%(Circular) | 64% | No | Yes | Unusable (risk of short-circuit exists after endurance test) |
| Comparative Example 3 | 17 | 95%(Circular) | 64% | No | Yes | Unusable (risk of short-circuit exists after endurance test) |
| Comparative Example 4 | 15 | 95%(Circular) | 64% | No | Yes | Unusable (risk of short-circuit exists after endurance test) |
| Comparative Example 5 | 13 | 95%(Circular) | 64% | Yes | No | Unusable (battery resistance is affected from initial stage) |

TABLE 1-continued

|  | Softness index of positive electrode plate | Flatness ratio of winding core | Longest inner peripheral diameter of winding body/longest inner peripheral diameter of wound electrode assembly | Occurrence of cracking of positive electrode mixture layer | Occurrence of buckling of positive electrode plate or negative electrode plate | Overall Evaluation |
|---|---|---|---|---|---|---|
| Comparative Example 6 | 19 | 64%(Flat rectangular) | 95% | Yes | No | Unusable (battery resistance is affected from initial stage) |
| Comparative Example 7 | 17 | 64%(Flat rectangular) | 95% | Yes | No | Unusable (battery resistance is affected from initial stage) |
| Comparative Example 8 | 15 | 64%(Flat rectangular) | 95% | Yes | No | Unusable (battery resistance is affected from initial stage) |
| Comparative Example 9 | 13 | 64%(Flat rectangular) | 95% | Yes | No | Unusable (battery resistance is affected from initial stage) |

As can be seen from Table 1, it was confirmed that in the wound electrode assembly produced by using the elliptical winding core having a softness index of 15 to 19, no cracking occurs in the positive electrode mixture layer, and no buckling occurs in the positive electrode plate and the negative electrode plate.

REFERENCE SIGNS LIST 1 outer package
2 sealing plate
3 wound electrode assembly
3a body portion
3b tab portion
4 positive electrode terminal
5 positive electrode current collector
6 negative electrode terminal
7 negative electrode current collector
8, 10 inner insulating member
9, 11 outer insulating member
12 insulating sheet
13 electrolyte injection hole
14 sealing plug
15 gas discharge valve
20 battery case
30 positive electrode plate
30a positive core body
30b positive electrode mixture layer
30c positive electrode tab
31 negative electrode plate
31a negative core body
31b negative electrode mixture layer
31c negative electrode tab
32 separator
40 winding body
41 winding core
100 non-aqueous electrolyte secondary battery

The invention claimed is:

1. A method for manufacturing a non-aqueous electrolyte secondary battery, the method including:
a winding body formation step of winding a positive electrode plate, a negative electrode plate, and a separator around an elliptical winding core to form a winding body; and
an electrode assembly formation step of removing the winding core from the winding body and then pressing the winding body to form a flat wound electrode assembly,
wherein
the positive electrode plate includes
a positive core body, and
a positive electrode mixture layer formed on each side of the positive core body,
the positive electrode mixture layer includes a lithium metal composite oxide represented by general formula $Li_{1+x}M_aO_{2+b}$ (where x, a, and b satisfy conditions that x+a=1, −0.2<x≤0.2, −0.1≤b≤0.1, and M includes Ni and Co and includes at least one element selected from the group consisting of Mn and Al),
a softness index of the positive electrode plate is 15 to 19, and
a ratio of the longest inner peripheral diameter of the winding body to the longest inner peripheral diameter of the wound electrode assembly is 71% to 94%.

2. The method for manufacturing a non-aqueous electrolyte secondary battery according to claim 1, wherein the positive electrode mixture layer has a packing density of 3.2 g/cm³ to 3.8 g/cm³.

3. A non-aqueous electrolyte secondary battery manufactured by the method according to claim 1, the battery comprising:
a flat wound electrode assembly in which a positive electrode plate and a negative electrode plate are wound with a separator interposed therebetween,
wherein
the positive electrode plate includes
a positive core body, and
a positive electrode mixture layer formed on each side of the positive core body,
the positive electrode mixture layer includes a lithium metal composite oxide represented by general formula $Li_{1+x}M_aO_{2+b}$ (where x, a, and b satisfy conditions that x+a=1, −0.2<x≤0.2, −0.1≤b≤0.1, and M includes Ni and Co and includes at least one element selected from the group consisting of Mn and Al),
a softness index of the positive electrode plate is 15 to 19.

4. The non-aqueous electrolyte secondary battery according to claim 3, wherein the positive electrode mixture layer has a packing density of 3.2 g/cm³ to 3.8 g/cm³.

* * * * *